US009135329B1

(12) United States Patent
Gupta

(10) Patent No.: US 9,135,329 B1
(45) Date of Patent: Sep. 15, 2015

(54) PRESENTING ITEM INFORMATION BASED ON ASSOCIATED ENTITY RELATIONSHIPS

(75) Inventor: Shashank Gupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 13/474,363

(22) Filed: May 17, 2012

Related U.S. Application Data

(60) Provisional application No. 61/616,246, filed on Mar. 27, 2012.

(51) Int. Cl.
*G06F 17/30* (2006.01)
(52) U.S. Cl.
CPC ................................. *G06F 17/3064* (2013.01)
(58) Field of Classification Search
CPC ............ G06F 17/3064; G06F 17/3097; G06F 17/30646; G06F 17/30395; G06Q 30/0253; G06Q 30/0601; G06Q 30/0631
USPC ........................................................ 707/767
See application file for complete search history.

(56) References Cited

U.S. PATENT DOCUMENTS

| | | | |
|---|---|---|---|
| 2004/0254676 A1* | 12/2004 | Blust et al. | 700/231 |
| 2005/0193002 A1* | 9/2005 | Souders et al. | 707/103 X |
| 2006/0041548 A1* | 2/2006 | Parsons et al. | 707/5 |
| 2009/0024621 A1* | 1/2009 | Burgess et al. | 707/6 |
| 2009/0132459 A1* | 5/2009 | Hicks | 706/52 |
| 2010/0162115 A1* | 6/2010 | Ringewald et al. | 715/716 |
| 2011/0103585 A1* | 5/2011 | Tuck et al. | 380/270 |
| 2012/0221561 A1* | 8/2012 | Brown et al. | 707/725 |

* cited by examiner

*Primary Examiner* — Thu-Nguyet Le
(74) *Attorney, Agent, or Firm* — Knobbe, Martens, Olson & Bear, LLP

(57) ABSTRACT

Systems and methods are provided for presenting item information to a user based on entity relationships. The items may be presented, for example, in response to a search request or as a recommendation of an item of potential interest to a user. In some embodiments, item information associated with a first item of interest to a user may be retrieved from a data store. A first entity related to the first item may be determined based on information retrieved from the data store. A second entity related to the first entity may then be determined, and a second item related to the second entity may be identified. Information identifying the second item may then be presented as a recommended item to the user.

18 Claims, 7 Drawing Sheets

PRESENTING ITEM INFORMATION BASED ON ASSOCIATED ENTITY RELATIONSHIPS

CROSS-REFERENCE TO RELATED APPLICATION

This application claims the benefit of U.S. Provisional Application No. 61/616,246, filed on Mar. 27, 2012, the entirety of which is incorporated herein by reference.

BACKGROUND

Retailers and merchants involved in electronic commerce often provide user interfaces from which a user may search an electronic catalog for products available for purchase and/or browse products included in an electronic catalog. For example, the user may enter a term or keyword of interest to the user, and may then be presented with search results. These search results may include, for example, products that include the entered term or keyword in a product description associated with the product. A retailer or merchant involved in electronic commerce may additionally provide a user with information identifying recommended items (such as products and/or services) that may be of potential interest to the user. These recommendations may be determined, for example, based on purchase history and/or browsing history that may tend to associate two items with each other based on the two items frequently being purchased by a single consumer and/or information associated with the two items frequently being browsed by a single user.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
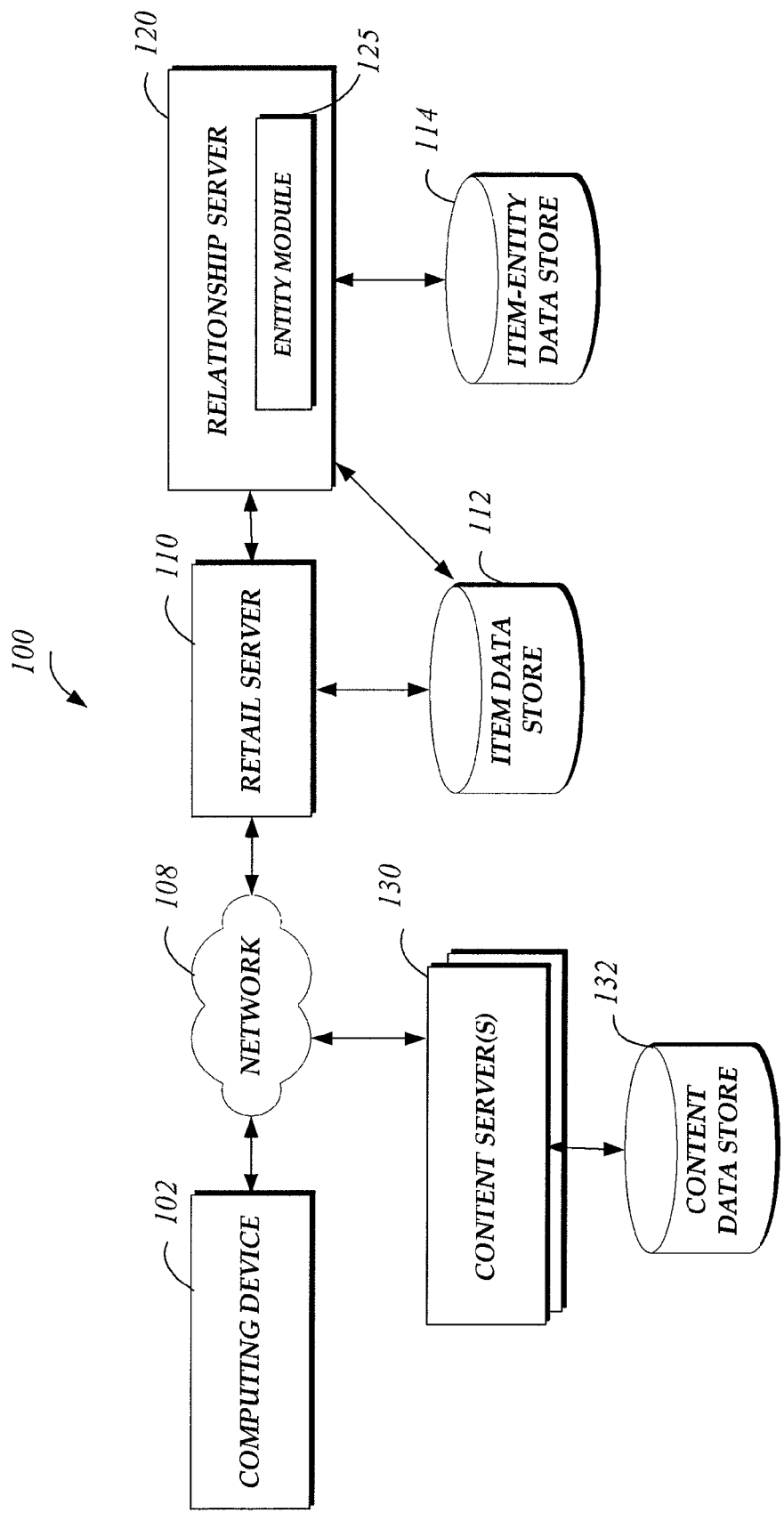
FIG. 1 is a block diagram depicting an illustrative operating environment in which entities may be associated with items, and in which items may be presented to a user based on associations between items and entities.

Generally described, aspects of the present disclosure relate to using entity relationship information that identifies associations between entities to associate items with entities, and to use this item-entity association information to identify items related to a given item, items related to a given search string, or items otherwise of potential interest to a user. As will be described in more detail below, an entity module as disclosed herein may indirectly associate items to each other based on those items' associations with one or more entities. Associations between items and entities may be used, in some embodiments, to provide a user with information identifying items both directly and indirectly associated with an entity of interest to the user and/or directly or indirectly associated with an item of interest to the user. For example, in some embodiments, aspects of present disclosure may be used to supplement or replace existing methods for searching for items and/or recommending items to a user, such as methods that determine relationships or associations between items based on purchase data and/or browsing data associated with other users.

For example, according to some embodiments, if a user searches for items based on the search string "hamlet," aspects of the present disclosure may determine that "Hamlet" is a character entity appearing in the play entity "The Tragedy of Hamlet, Prince of Denmark," by author entity "Shakespeare." Aspects of the present disclosure may further determine other entities associated with this play entity, author entity and/or character entity (such as, for example, a time period entity, another character entity appearing in the play, an author entity influenced by Shakespeare, etc.). The user may then, in some embodiments, be presented with search results that include items related to the Shakespeare entity, items related to the Hamlet character entity, and/or items related to the play entity, as well as items associated with one or more of the other entities determined to be associated with these entities. The presented search results may be presented either in addition to or instead of traditional search results that may include items with an instance of the word "hamlet" in their description or title.

As discussed further below, an item may generally refer to a product and/or service available for browse and/or purchase by a user. An entity may generally refer to a person, place or thing. Examples of entities may include a real city, a fictional location, a real person, a fictional character, a subject, an event, a sport, a company, a book or story, a movie, a historical figure, a celebrity, an animal, a food item, a time period, an author, an actor, etc. In the case of a book, for example, the book as an entity may generally refer to the story or underlying work, without being identified in terms of a specific version of the book or embodiment of the work. A specific embodiment of that underlying work in a product, such as a paperback version of a certain edition of the book, may be considered an item, in certain embodiments. Entities may be organized into one or more predefined categories, such as people, organizations, locations, expressions of time, quantities, monetary values, percentages, etc.

The illustrative operating environment shown in FIG. 1 includes a system 100 in which users may browse and place orders for items (such as products listed in an electronic catalog), as well as be presented with items based on entity relationship information. The system 100 may include one or more relationship servers 120 that include an entity module 125 that may be used to implement various aspects of the present disclosure, such as determining item and entity associations, and presenting item information based on these associations. The environment also includes one or more content servers 130, which may provide access to content or data from which the relationship server 120 may determine entity information and/or associations between entities. The environment further includes one or more retail servers 110 that facilitate electronic browsing and purchasing of goods and/or services (which may be referred to as "items" herein) using various user devices, such as computing device 102.

Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like.

The relationship server 120, which will be described below in more detail, may be connected to or in communication with an item-entity data store 114 that stores data associating items with entities and/or other items, and entities with items and/or other entities. The retail server 110 may be connected to or in communication with an item data store 112 that stores item information regarding a number of items, such as items available for browse and/or purchase via the retail server 110. Item data stored in item data store 112 may include any information related to each item. For example, item data may include, but is not limited to, price, availability, title, item identifier, item feedback (e.g., user reviews, ratings, etc.), item image, item description, item attributes, keywords associated with the item, etc. In different embodiments, each of item data store 112 and/or item-entity data store 114 may be local to relationship server 120, may be local to retail server 110, may be remote from both relationship server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, need not be described in more detail herein.

In the environment shown in FIG. 1, the computing device 102, retail server 110 and/or relationship server 120 may communicate with one or more content servers 130 via a communication network 108, such as the Internet or other communications link. The one or more content servers 130 may provide access to various content data stores, such as content data store 132, that include information or data from which the relationship server 120 may determine information regarding entities and/or relationships between entities. For example, in some embodiments, content data store 132 may store structured data regarding various entities and/or associations between entities, such as data from which a graph can be created that identifies associations between various entities. In some embodiments, content servers 130 may additionally or alternatively include unstructured data or freeform data from which entities can be identified and entity-to-entity relationships determined, such as from narrative text included in a page or a data entry regarding a person, place or thing. For example, content server(s) 130 could include a service providing direct access to data identifying associations between entities, and/or to a general or topic-specific reference source, such as a reference that includes encyclopedia-like entries for various entities.

The system 100 is depicted in FIG. 1 as operating in a distributed computing environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores (not illustrated), as is done in conventional electronic commerce systems. In certain embodiments, the retail server 110 may also access item data from other data sources, either internal or external to system 100. While system 100 illustrates an embodiment in which the relationship server 120 communicates with a retail server 110, in other embodiments, a relationship server 120 may operate independently of a retail environment. In such embodiments, the relationship server 120 may communicate with the computing device 102 and/or item data store 112 without the presence of a retail server.

Figure 2:
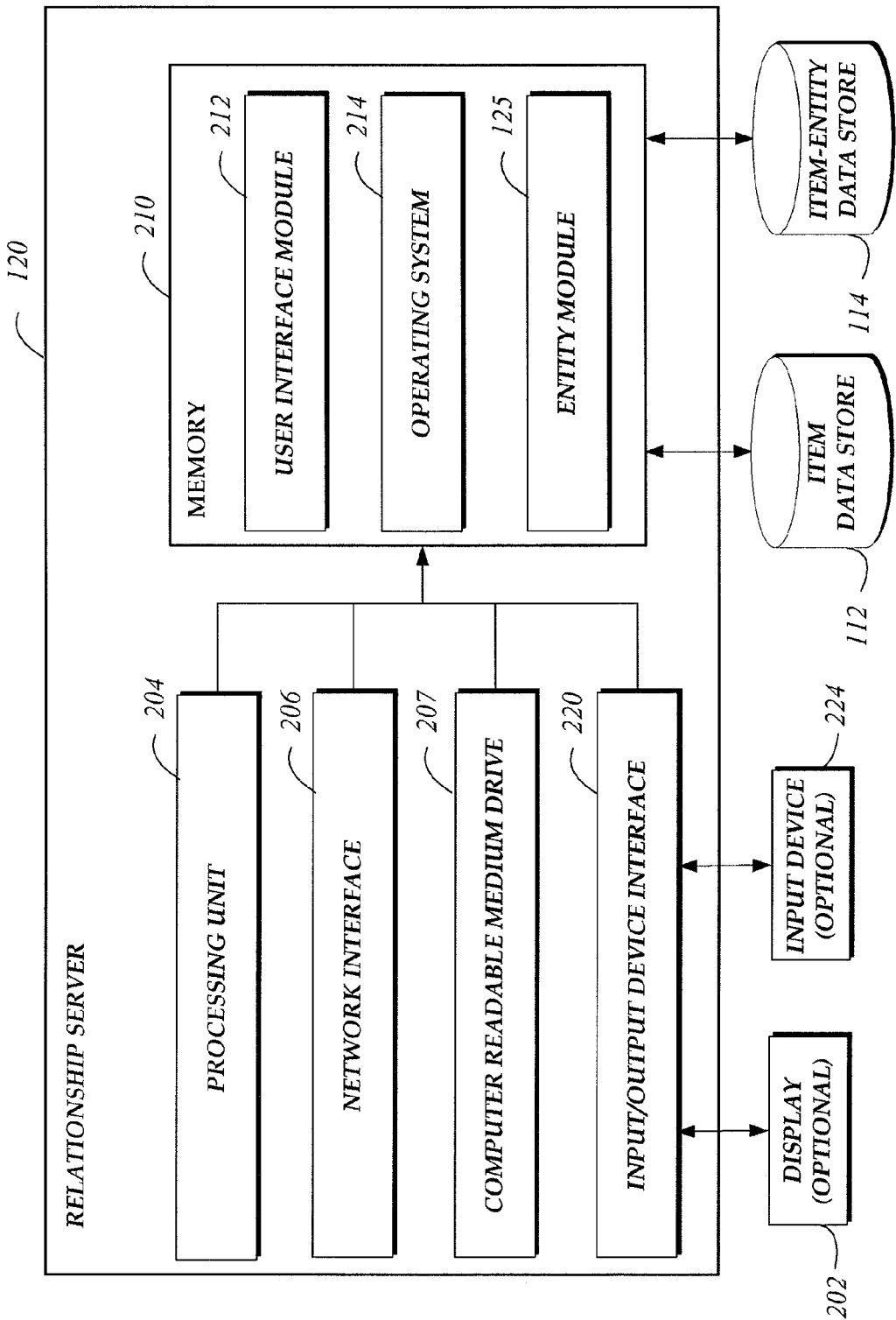
FIG. 2 depicts a general architecture of a relationship server for associating items and entities, and for using item-entity association information to present items to a user.

FIG. 2 depicts an example of a general architecture of a relationship server 120 for creating and using relationship information associating items and entities. The general architecture of the relationship server 120 depicted in FIG. 2 includes an arrangement of computer hardware and software components that may be used to implement aspects of the present disclosure. The relationship server 120 may include many more (or fewer) components than those shown in FIG. 2. It is not necessary, however, that all of these generally conventional components be shown in order to provide an enabling disclosure. As illustrated, the relationship server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent or non-transitory computer-readable media. The memory 210 may store an operating system 214 that provides computer program instructions for use by the processing unit 204 in the general administration and operation of the relationship server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with an auxiliary item data store 112 and/or item-entity data store 114, discussed above with reference to FIG. 1.

In addition to the user interface module 212, the memory 210 may include an entity module 125 that may be executed by the processing unit 204. In one embodiment, the entity module 125 implements various aspects of the present disclosure, e.g., associating items and entities, exploring entity relationship information to recommend items and/or present search results, etc., as described further below. While the entity module 125 is shown in FIG. 2 as part of the relationship server 120, in other embodiments, all or a portion of an entity module may be a part of the retail server 110. For example, in certain embodiments of the present disclosure, the retail server 110 may include several components that operate similarly to the components illustrated as part of the relationship server 120, including a user interface module, entity module, processing unit, computer readable medium drive, etc. In such embodiments, the retail server 110 may communicate with an item-entity data store, such as item-entity data store 114, and the relationship server 120 may not be needed in certain embodiments. Further, although certain examples are illustrated herein in the context of a retail server 110, this is not a limitation on the systems and methods described herein, as noted above.

Figure 3:
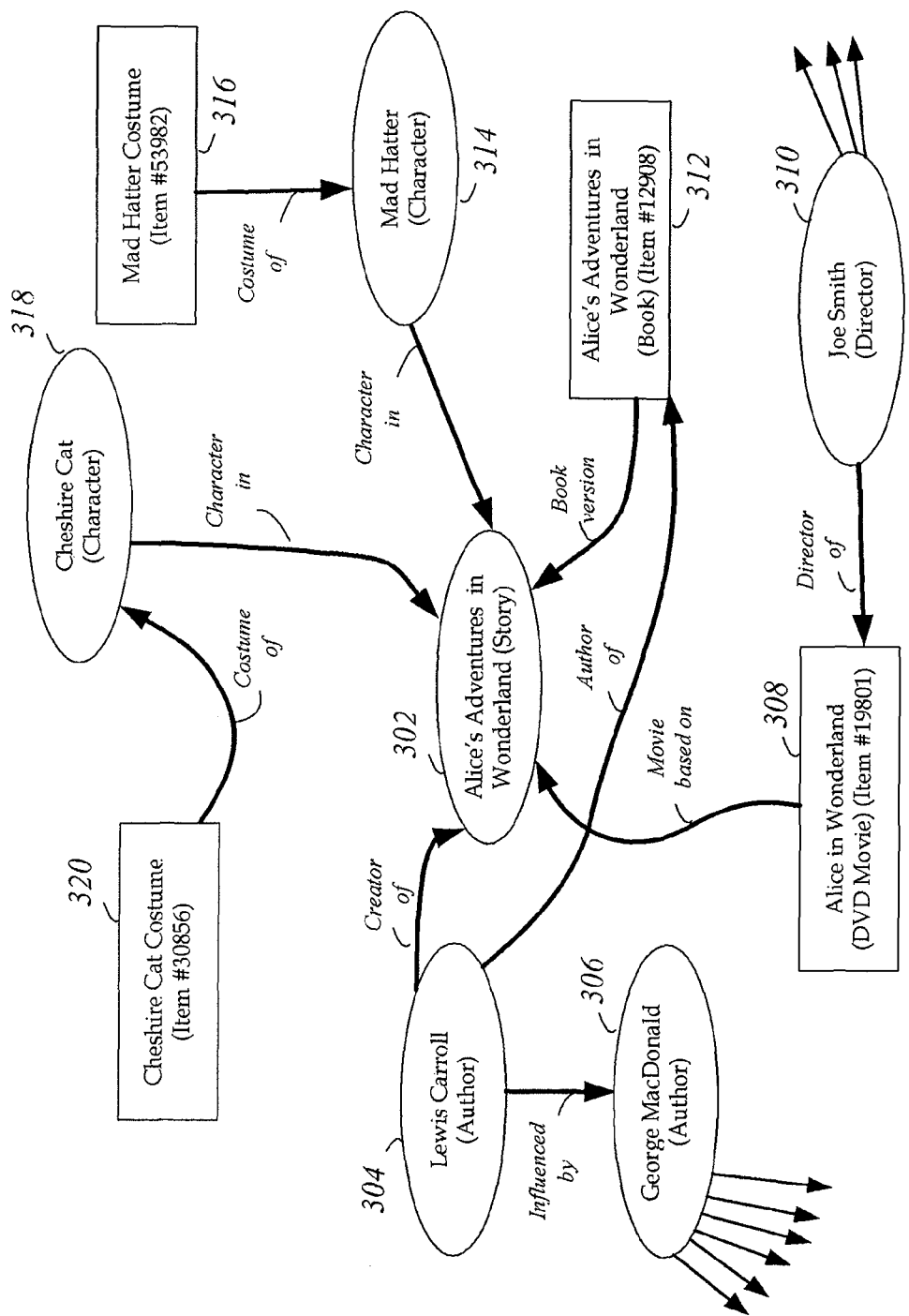
FIG. 3 is an illustrative representation of associations between entities and items.

FIG. 3 includes an illustrative representation or visualization of associations between entities and items. The illustrative representation of relationships between items and entities may be considered a visual representation of portions of the data stored in item-entity data store 114, where the stored association information may have been determined at least in part by the relationship server 120. The associations may have been determined by the relationship server 120, in some embodiments, based on item data retrieved from item data store 112 and entity data retrieved from one or more third-party sources, such as data received from content server(s) 130 and/or retrieved from content data store 132. According to certain embodiments, the relationship server 120 uses automated techniques, such as neural networks, machine learning, collaborative filtering, and content-based filtering, to discover entities and relationships. As discussed above, content data store 132 may store structured data regarding various entities and/or associations between entities, such as data from which a graph can be created that identifies associations between various entities (but which does not include item information or item associations). For example, the structured data may be parsed by the relationship server 120 to determine relationship information. In some embodiments, content servers 130 may additionally or alternatively include unstructured data from which entities can be identified and entity-to-entity relationships determined, such as from narrative text included in a page or data entry regarding a person, place or thing. According to certain embodiments, the content data store 132 may include crowd-sourced databases or collaborative-based databases written collaboratively by volunteers, community members, or other individuals.

In the visual representation illustrated in FIG. 3, items are represented as squares (such as item 308) and entities are represented as ovals (such as entity 302). As illustrated, item 308, identified as a DVD movie entitled "Alice in Wonderland," is associated with the entity 302 (a story entity identified as "Alice's Adventures in Wonderland") with the relation information identifying that item 308 is a "movie based on" story entity 302. Similarly, item 312 is another item (a book) also associated with story entity 302. Also associated with story entity 302 is author entity 304 and character entities 314 and 318. Items 316 and 320 are associated with entities 314 and 318, respectively. For example, item 320 is identified as a costume of the character entity "Cheshire Cat" 318, which itself is identified as a character in the story entity "Alice's Adventures in Wonderland" 302. Author entity 304 is associated with entity 306, where the association information identifies that author entity Lewis Carroll 304 was "influenced by" author entity George MacDonald 306, who may then be associated with a number of other entities and/or items (not illustrated). Director entity 310 is associated with item 308, where the association indicates that director entity Joe Smith 310 is the "director of" the movie item 308 (identified as "Alice in Wonderland (DVD Movie)").

In some embodiments, the relationship server 120 may determine associations between items and entities, such as the association information represented in FIG. 3, based on identifying one or more entity names that appear in item information retrieved from item data store 112. For example, the relationship server 120 may determine names of entities from either structured or unstructured data retrieved from content server(s) 130 and/or content data store 132, and then store entity information and entity-to-entity association information in item-entity data store 114. The relationship server 120 may then, for each of a number of items with item data stored in item data store 112, search item data (such as item attributes, item descriptions and/or item keywords) to identify an occurrence of one or more of the entity names retrieved from content server(s) 130 and/or content data store 132. For each entity name, the relationship server 120 may then create an association between the entity and each item that includes an occurrence of the given entity name in its item data.

In some embodiments, the item-to-entity association may only be created for certain entities if more than a certain minimum number of related entity names appear in item information for a given item. In some embodiments, the minimum number may depend on how common the terms appearing in each entity name are. For example, if the word "Juliet" appears in item information for a given item, the relationship server 120 might not automatically associate the item with a character entity for "Juliet" (representing a character appearing in Shakespeare's "Romeo and Juliet" play) unless some other entity related to the "Juliet" character entity appears in the given item's item information (such as, for example, character entity name "Romeo" and/or author entity name "Shakespeare"). In some embodiments, the relationship server 120 may additionally or alternatively consider attributes associated with a given entity when determining associated items, where an entity's attributes may include terms or characteristics associated with the entity. For example, the relationship server 120 may consider not only whether a given entity name appears in an item's item information, but also whether one or more attribute names associated with that entity appear in the given item's item information.

FIG. 3 is described above with reference to an embodiment in which the item-entity data store 114 stores information that associates both items with entities and entities with other entities. In other embodiments, the item-entity data store 114 may store associations between each item and one or more entities, without directly storing entity-to-entity associations. In such embodiments, the relationship server 120 may determine the entity-to-entity associations as needed from one or more external sources, such as entity data retrieved from content server(s) 130.

Figure 4:
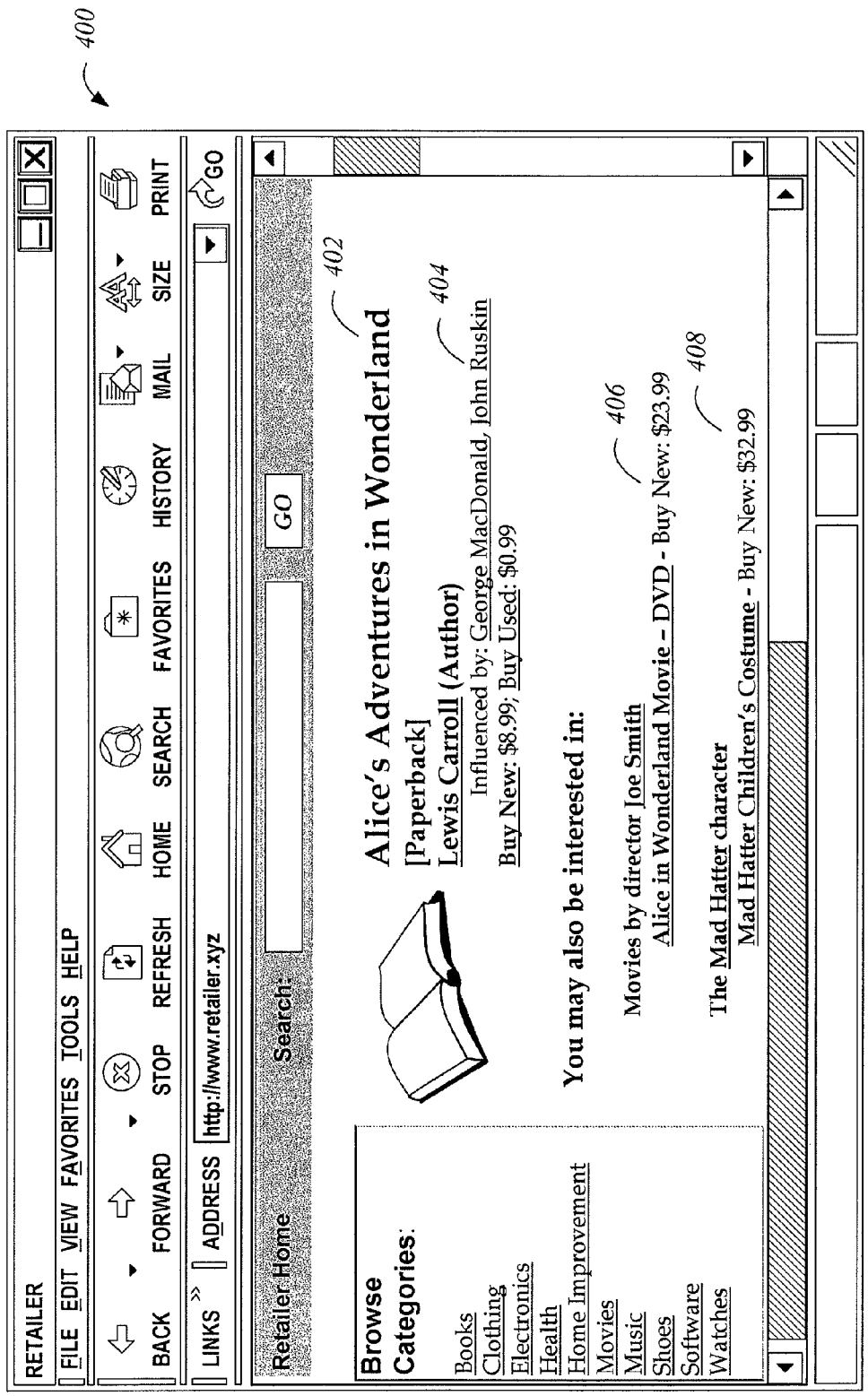
FIG. 4 is an illustrative user interface generated at least in part by a relationship server that includes item information regarding an item and information identifying associated items determined based at least in part on entity relationships.

FIG. 4 is an illustrative user interface 400 generated at least in part by the relationship server 120 that includes item information regarding an item 402 and information identifying associated items 406 and 408 determined based at least in part on entity relationship information. As shown, the user interface 400 is displayed via a browser operating upon a computing device, such as computing device 102, utilized by a user.

In some embodiments, the user interface 400 may be generated in part by the retail server 110 based on information received from relationship server 120.

Illustrative user interface 400 may be presented to the user in response to a user request to view item information for item 402 and/or information identifying items related to item 402. The user interface 400 includes author information 404, which identifies authors that influenced author "Lewis Carroll" (identified as the author of book item 402). The author names identified in author information 404 may have been determined, for example, based on the item-entity association information discussed above with reference to FIG. 3. For example, item 312 in FIG. 3 may represent item 402 in FIG. 4. As illustrated in FIG. 3, author entity "Lewis Carroll" is indicated as "influenced by" author entity George MacDonald, which may be the reason that the relationship server 120 has presented author information 404 in user interface 400.

User interface 400 includes information identifying an item 406 (a movie directed by Joe Smith, entitled "Alice in Wonderland Movie—DVD") that the relationship server 120 has determined may be of interest to the user based on its relation to item 402 and/or based on its relation to one or more entities known to be of interest to the user. The item 406 in FIG. 4 may correspond to item 308 discussed above with reference to FIG. 3. The relationship server 120 may have presented the information identifying related item 406, for example, because the item is associated with story entity 302, which is in turn associated with item 312 (identified as item 402 in FIG. 4). Accordingly, the relationship server 120 may have determined that the movie item 406 is indirectly associated with the book item 402 based on their shared association with the same story entity. In a similar manner, costume item 408 ("Mad Hatter Children's Costume") may have been presented by the relationship server 120 based on the given costume item (identified as item 316 in FIG. 3) being related to the Mad Hatter character entity 314, which is related to story entity 302, which is in turn related to book item 312 (identified as item 402 in FIG. 4). Accordingly, the relationship server 120 may have recommended the item 408 based on an indirect association between items 402 and 408 (more specifically, an association from a first item to a first entity, from the first entity to a second entity, then from the second entity to the second item).

While user interface 400 generally includes information indentifying entities and items that are each directly or indirectly associated with a primary item 402, a user interface similar to user interface 400 may be generated by the relationship server 120, in some embodiments, that includes information identifying entities and items that are each directly or indirectly associated with a primary entity. For example, a user interface that presents information regarding the author entity "Lewis Carroll" may include information identifying items associated with the author entity (such as information identifying book item 402 and/or other items), as well as information identifying entities associated with the author entity (such as the "influenced by" authors 404).

Figure 5:
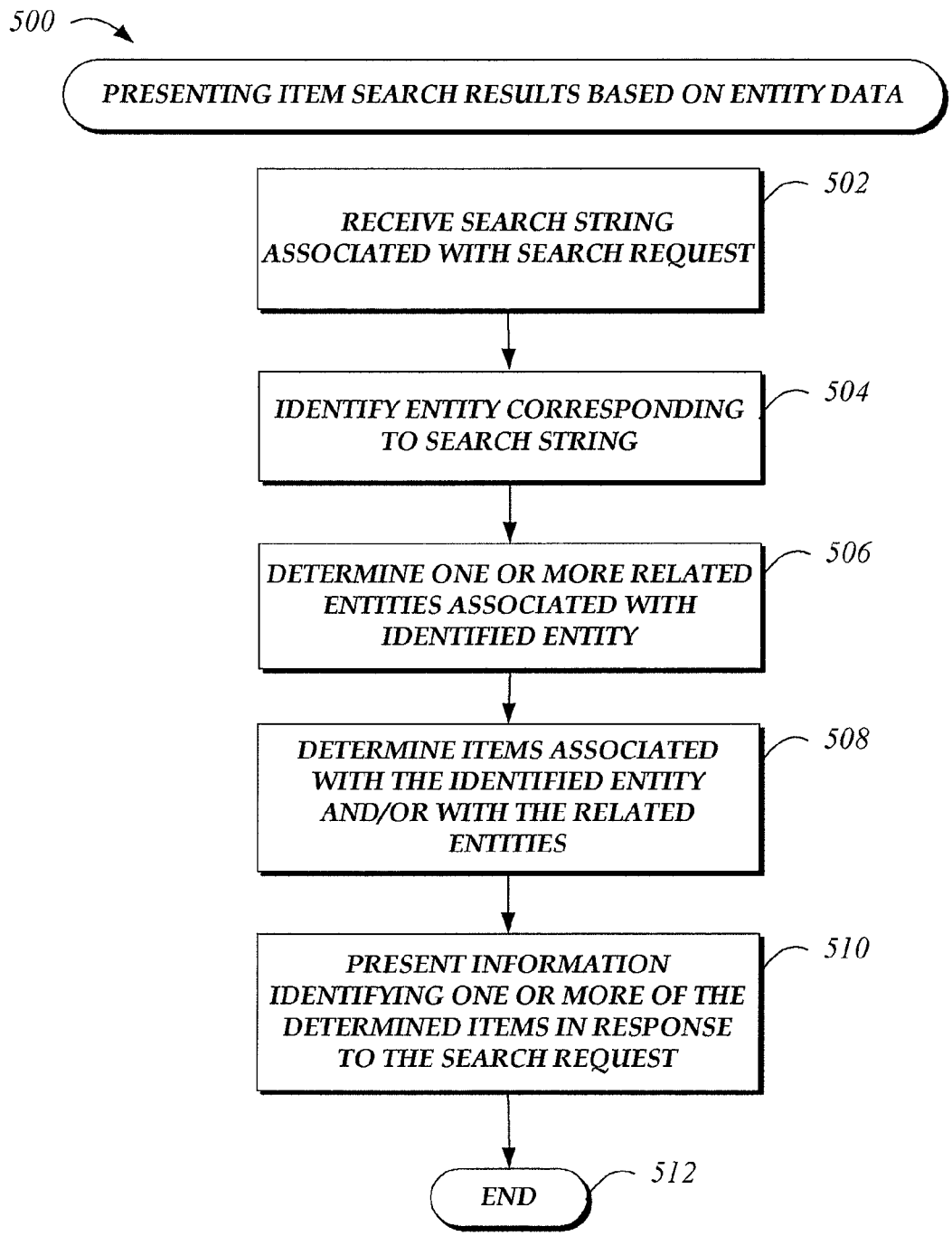
FIG. 5 is a flow diagram of an illustrative method implemented by an entity module for presenting item search results based at least in part on entity data.

FIG. 5 is a flow diagram of an illustrative method 500 implemented by the entity module 125 for presenting item search results based at least in part on entity data. The illustrative method 500 begins at block 502, where the entity module 125 receives a search string associated with a search request. For example, the search string may be submitted by a user and/or may be received by the relationship server 120 from another system, such as retail server 110. The search string could include, for example, one or more words for which a user has requested to view related items. At block 504, the entity module 125 identifies an entity corresponding to the search string. For example, the entity module 125 may search entity data from item-entity data store 114 and/or a service or other data source that provides entity information (such as content server(s) 130) to determine an entity name that matches the search string. In some embodiments, the entity module 125 may determine that the search string matches an entity name even if the search string is not identical to the entity name. For example, the entity module 125 may determine that an entity matches the search string even if the user entered only a portion of an entity name, or if the search string included the entity name along with one or more additional words. Examples of specific search strings are discussed below with reference to FIGS. 6 and 7.

Once the entity module 125 has determined an entity corresponding to the search string, the method proceeds to block 506, where the entity module 125 determines one or more related entities associated with the identified entity. The one or more related entities may be determined, for example, based on entity relationship data retrieved from item-entity data store 114, discussed in more detail above. Next, at block 508, the entity module 125 determines one or more items associated with the entity identified at block 504 and/or with the related entities determined at block 506. These associations may be determined, for example, based on entity relationship data retrieved from item-entity data store 114. At block 510, the entity module 125 presents information identifying one or more of the determined items in response to the search request, such as in a user interface similar to those discussed below with reference to FIGS. 6 and 7. As discussed above, in some embodiments, the one or more items determined by illustrative method 500 may be supplemented with additional search results determined using one or more other search methods. The illustrative method ends at block 512.

Figure 6:
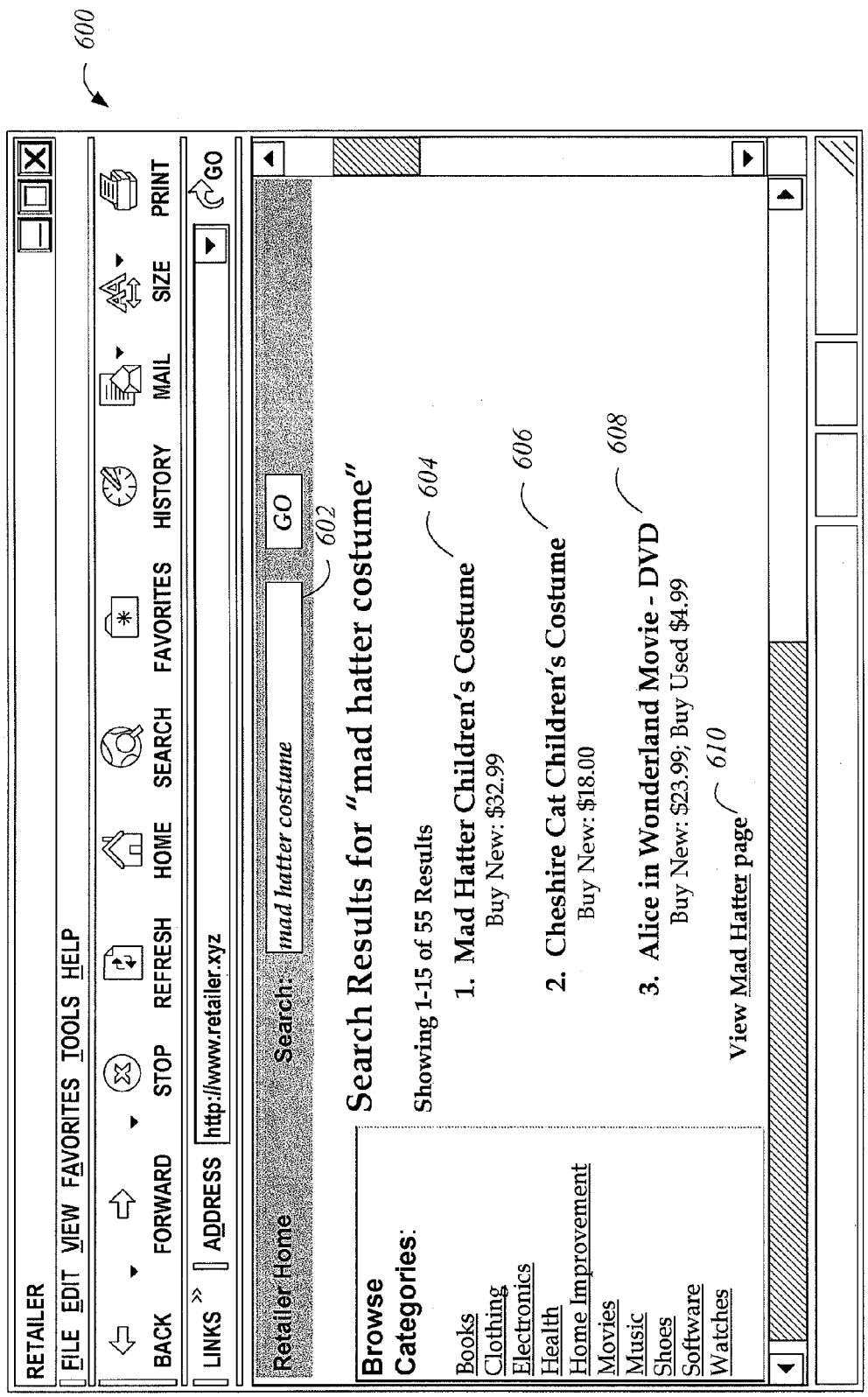
FIGS. 6 and 7 are illustrative user interfaces generated at least in part by the relationship server that include item search results determined based at least in part on entity and item associations.

FIG. 6 is an illustrative user interface 600 generated at least in part by the relationship server 120 that includes item search results determined based at least in part on entity and item associations. As illustrated, a user has entered search string 602, which reads "mad hatter costume." The first search result in user interface 600, item 604 ("Mad Hatter's Children's Costume"), may be a search result obtained using a traditional search method, such as a search performed by the retail server 110 by searching for items in item data store 112 that include item information with one or more of the words in the search string. The other items 606 and 608, on the other hand, may have been determined by the entity module 125, such as by implementing illustrative method 500, discussed above.

For example, the entity module 125 may have determined that the search string 602 includes the character entity name "Mad Hatter" (shown as entity 314 in FIG. 3, discussed above). The entity module 125 may then have determined that the Mad Hatter character entity is associated with the "Alice's Adventures in Wonderland" story entity (entity 302 in FIG. 3). The entity module 125 may then have determined that the story entity is associated with the "Cheshire Cat" character entity (entity 318 in FIG. 3), which is then associated with the "Cheshire Cat Costume" item (identified as item 320 in FIG. 3 and item 606 in FIG. 6). The entity module 125 may have similarly presented item 608 in the search results based on the "Alice in Wonderland Movie—DVD" item 608 also being associated with the same story entity 302. The entity module 125 may have listed item 606 relatively higher in the search results than item 608, for example, because the entity module 125 may have determined that the item 606 is associated with the item type or item attribute "costume" that was entered in the search string 602.

As illustrated, user interface 600 also includes an option 610 that may be selected by the user in order to request that the entity module 125 generate a user interface associated with the Mad Hatter character entity. Such a user interface may include, in some embodiments, general information regarding the Mad Hatter character, items associated with the Mad Hatter character entity, and/or information identifying other entities related to the Mad Hatter character entity. In some embodiments, the relationship server 120 may be configured to generate a similar user interface associated with any of a number of different entities. For example, the relationship server 120 may be configured to generate a page or user interface associated with any given entity, where the page or user interface may provide information, items, and/or other entities associated with the given entity.

Figure 7:
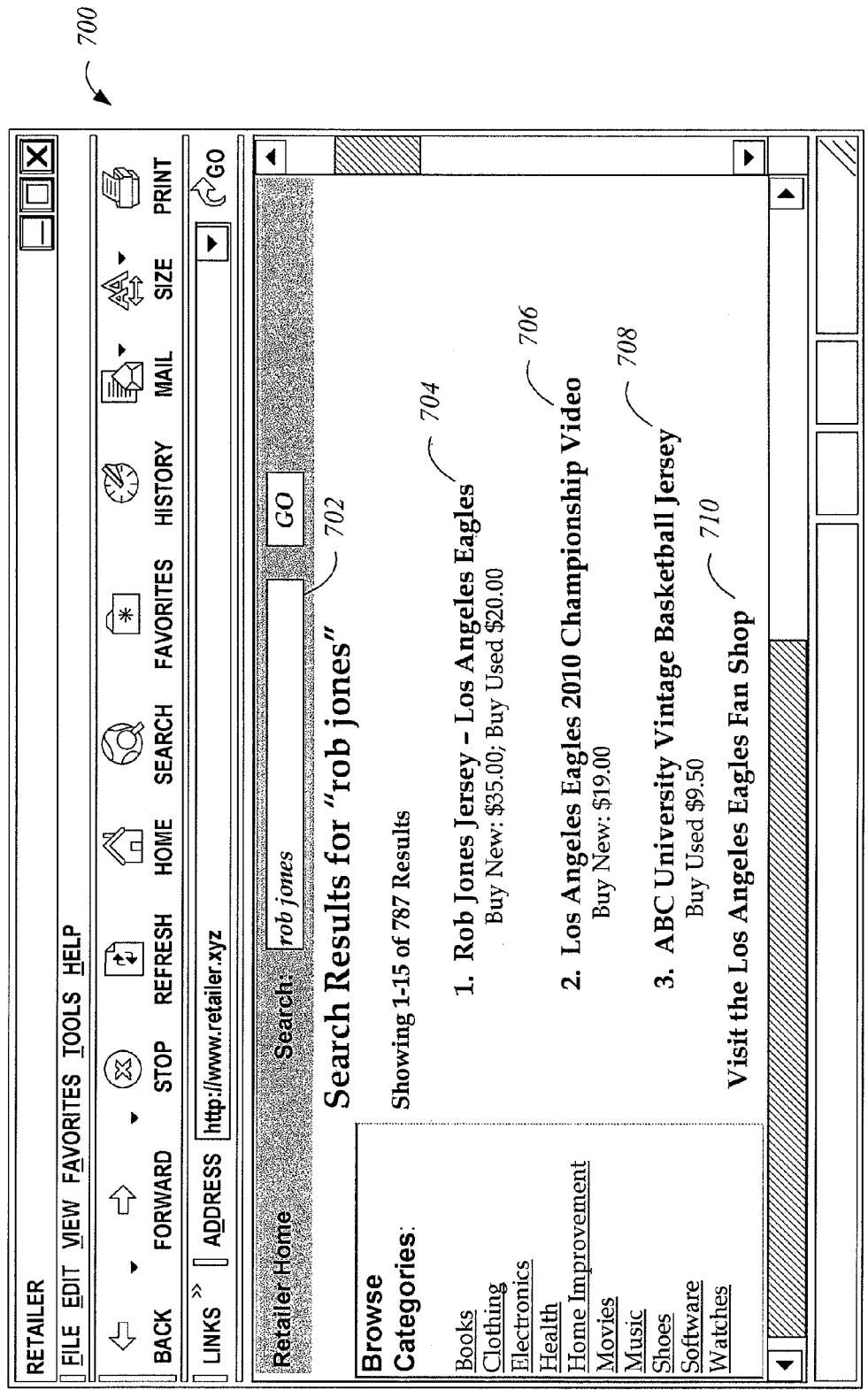

FIG. 7 is an illustrative user interface 700 generated at least in part by the relationship server 120 that includes item search results determined based at least in part on entity and item associations. As illustrated, the user has entered search string "rob jones." The entity module 125 may have determined that the search string corresponds to an entity name "Rob Jones," who is a professional basketball player. In other words, when the user searches for "Rob Jones," the entity module 125 determines, based on the item-entity data store 114, that the user may be searching for the entity "Rob Jones—a professional basketball player" (instead of an entity "Rob Jones—a college professor") and may present the user with merchandise for other players on his team. Thus, the item-entity data store 114 may include semantic information or knowledge about the entities, which may be used to provide product recommendations. The entity module 125 may have presented search results 704-710 based on a method similar to illustrative method 500 discussed above. For example, the entity module 125 may have presented information identifying item 704 based on item 704 being associated with the athlete entity Rob Jones and/or based on the search term "rob jones" appearing in the item information for item 704. The entity module 125 may have determined that the athlete entity Rob Jones is associated with the team entity Los Angeles Eagles (which may be the professional basketball team for which Rob Jones currently plays). The entity module 125 may have presented information identifying item 706 based on a determination that item 706 is associated with the team entity Los Angeles Eagles. The entity module 125 may have included option 710 in order for the user to be able to select the option in order to view more items associated with the Los Angeles Eagles entity. In some embodiments, a user interface similar to illustrative user interface 700 may include an option that enables the user to view a user interface or page associated with the athlete entity Rob Jones, which may include a number of items associated with Rob Jones and/or information regarding Rob Jones, such as team information, biographical information, etc. (not illustrated). The illustrative user interface 700 also includes item 708 ("ABC University Vintage Basketball Jersey"), which the entity module 125 may have included based on a determination that the athlete entity Rob Jones is associated with the team entity ABC University Basketball (which may be a college basketball team for which Rob Jones used to play), and that item 708 is associated with the team entity ABC University Basketball.

While certain uses of item and entity association information have been discussed above, it will be appreciated that item and entity association information may be used in various other ways. For example, in some embodiments, the relationship server 120 may enable a user to select one or more entities as a filter or refinement for a search (such as for a search that does not include the selected one or more entities within the search string itself). In some embodiments, the retail server 110 and/or relationship server 120 may determine entities of general interest to a given user based on browsing and/or purchasing data, and may use this information to personalize aspects of the user's interactions with the retail server 110. As an example, the relationship server 120 may determine that a given user is a fan of the Los Angeles Eagles basketball team based on the fact that the user has purchased and/or browsed information regarding multiple items that are associated either directly or indirectly with the Los Angeles Eagles team entity. The relationship server 120 may then provide the user with information regarding the entity of interest (such as newly available items associated with the Los Angeles Eagles or tickets for sale for the Los Angeles Eagles). The relationship server 120 may also, in some embodiments, use information regarding entities known to be of interest to a user in order to sort or filter item search results or recommendations for that user based on inferred knowledge regarding which of multiple entities associated with an item viewed by the user or search string entered by the user is likely the entity of primary interest to the user.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
receiving a search string associated with a request to search an electronic catalog of items;
identifying a first entity corresponding to the search string, wherein the first entity is of a first type, wherein the first type is one of a person, an organization, a place, a story or a character;
determining a second entity related to the first entity, wherein the second entity is different than the first entity, wherein the second entity is of a second type that is different than the first type, wherein the second entity is determined to be related to the first entity based at least in part by retrieving stored data that identifies entity-to-entity relationships between individual entities of a plurality of entities;
determining an item related to the second entity; and
automatically presenting information identifying the item related to the second entity in response to the request to search the electronic catalog of items.

2. The computer-implemented method of claim 1, wherein the second entity is determined to be related to the first entity based in part by parsing the stored data that identifies the entity-to-entity relationships.

3. The computer-implemented method of claim 1, wherein the second entity is determined to be related to the first entity based in part by analyzing unstructured data.

4. The computer-implemented method of claim 1, wherein the second entity is determined to be related to the first entity based in part on a neural network, machine learning, collaborative filtering, or any combination thereof.

5. The computer-implemented method of claim 1, wherein the second type of the second entity is one of a person, a place, a subject, a time period, a work, or an organization.

6. The computer-implemented method of claim 1, wherein the item is determined to be related to the second entity based at least in part by determining that item information associated with the item includes a name of the second entity.

7. A system comprising:
a data store configured to store item information associated with a plurality of items; and
a computing device in communication with the data store and that is configured to at least:
receive a search string associated with a request to search an electronic catalog of items;
identify an entity corresponding to the search string, wherein the entity is of a first type;
determine a second entity that is associated with the identified entity, wherein the second entity is of a second type that is different than the first type, wherein the second entity is determined to be associated with the identified entity based at least in part by retrieving stored data that identifies entity-to-entity associations between individual entities of a plurality of entities;
determine one or more items associated with the second entity, wherein the one or more items associated with the second entity are determined based at least in part on item information retrieved from the data store; and
automatically present information identifying the one or more items associated with the second entity in response to the request to search the electronic catalog of items.

8. The system of claim 7, wherein the first type of the identified entity is a person, a place, or an organization.

9. The system of claim 7, wherein the entity corresponding to the search string is identified based at least in part by matching text included in the search string with a name of the identified entity.

10. The system of claim 7, wherein the second entity is based at least in part on a search filter selected by a user that submitted the request.

11. The system of claim 7, wherein the second entity is determined to be of potential interest to a user that submitted the request based at least in part on purchase data associated with the user, browsing data associated with the user, or both.

12. The system of claim 7, wherein the plurality of items comprises products included in the electronic catalog.

13. The system of claim 7, wherein the stored data comprises a graph that identifies the entity-to-entity associations between individual entities of the plurality of entities.

14. A non-transitory computer-readable storing computer executable instructions that, when executed by one or more computing devices, configure the one or more computing devices to perform operations comprising:
identifying an entity corresponding to a search string submitted by a client device, wherein the search string is submitted in association with a request to search a plurality of items, wherein the entity is identified based on a name of the entity matching at least a portion of the search string;
determining a second entity that is associated with the identified entity, wherein a type of the second entity is different than a type of the identified entity, wherein the second entity is determined to be associated with the identified entity based at least in part by retrieving stored data that identifies entity-to-entity associations between individual entities of a plurality of entities, wherein the type of the second entity is one of a person, an organization, a place, a story or a character;
determining one or more items associated with the second entity based at least in part on item information associated with the one or more items; and
causing display of an interface that includes two or more items in response to the request to search the plurality of items, the two or more items including the one or more items associated with the second entity.

15. The non-transitory computer-readable medium of claim 14, wherein the interface includes information identifying the second entity determined to be associated with the identified entity.

16. The non-transitory computer-readable medium of claim 14, wherein the type of the identified entity is a person, wherein the type of the second entity is an organization associated with the person.

17. The non-transitory computer-readable medium of claim 14, wherein the interface includes an option to filter the two or more items included in the interface based at least in part on a selection of an entity.

18. The non-transitory computer-readable medium of claim 14, wherein the interface includes a selectable option that includes a name of the identified entity, such that selection of the selectable option causes display of a plurality of items associated with the identified entity.

* * * * *